Aug. 5, 1941.   H. W. SIMPSON   2,251,378
MOWER STRUCTURE
Original Filed Oct. 30, 1939   3 Sheets-Sheet 1

INVENTOR.
HOWARD W. SIMPSON
BY
ATTORNEYS

Aug. 5, 1941.   H. W. SIMPSON   2,251,378
MOWER STRUCTURE
Original Filed Oct. 30, 1939   3 Sheets-Sheet 3

INVENTOR.
HOWARD W. SIMPSON
BY
ATTORNEYS

Patented Aug. 5, 1941

2,251,378

UNITED STATES PATENT OFFICE 2,251,378

MOWER STRUCTURE

Howard W. Simpson, Dearborn, Mich., assignor to Detroit Harvester Company, Detroit, Mich., a corporation of Michigan Original application October 30, 1939, Serial No. 302,043, now Patent No. 2,245,447, dated June 10, 1941. Divided and this application July 15, 1940, Serial No. 345,662

16 Claims. (Cl. 56—25)

This invention relates generally to tractor mower assemblies and constitutes a division of my application filed October 30, 1939, bearing Serial No. 302,043, now Patent No. 2,245,447, granted June 10, 1941.

One of the essential objects of the invention is to provide an assembly of this type wherein the mower structure is mounted to swing vertically relative to its supporting means, and the supporting means for the mower structure is mounted to swing vertically relative to the tractor.

Another object is to provide an assembly wherein a single means serves to swing the mower structure and to swing the supporting means as aforesaid.

Another object is to provide an assembly wherein an element constituting a part of the swinging means just mentioned is carried by the mower structure and is engageable with a part of the supporting means to limit swinging movement of the mower structure relative to the supporting means.

Another object is to provide an assembly wherein the limiting element referred to cooperates with the supporting means to cause the mower structure to be swung with the suporting means relative to the tractor.

Another object is to provide an assembly that is simple in construction, economical to manufacture and efficient in operation.

Other objects, advantages and novel details of construction of this invention will be made more apparent as this description proceeds, especially when considered in connection with the accompanying drawings, wherein.

Figure 1:
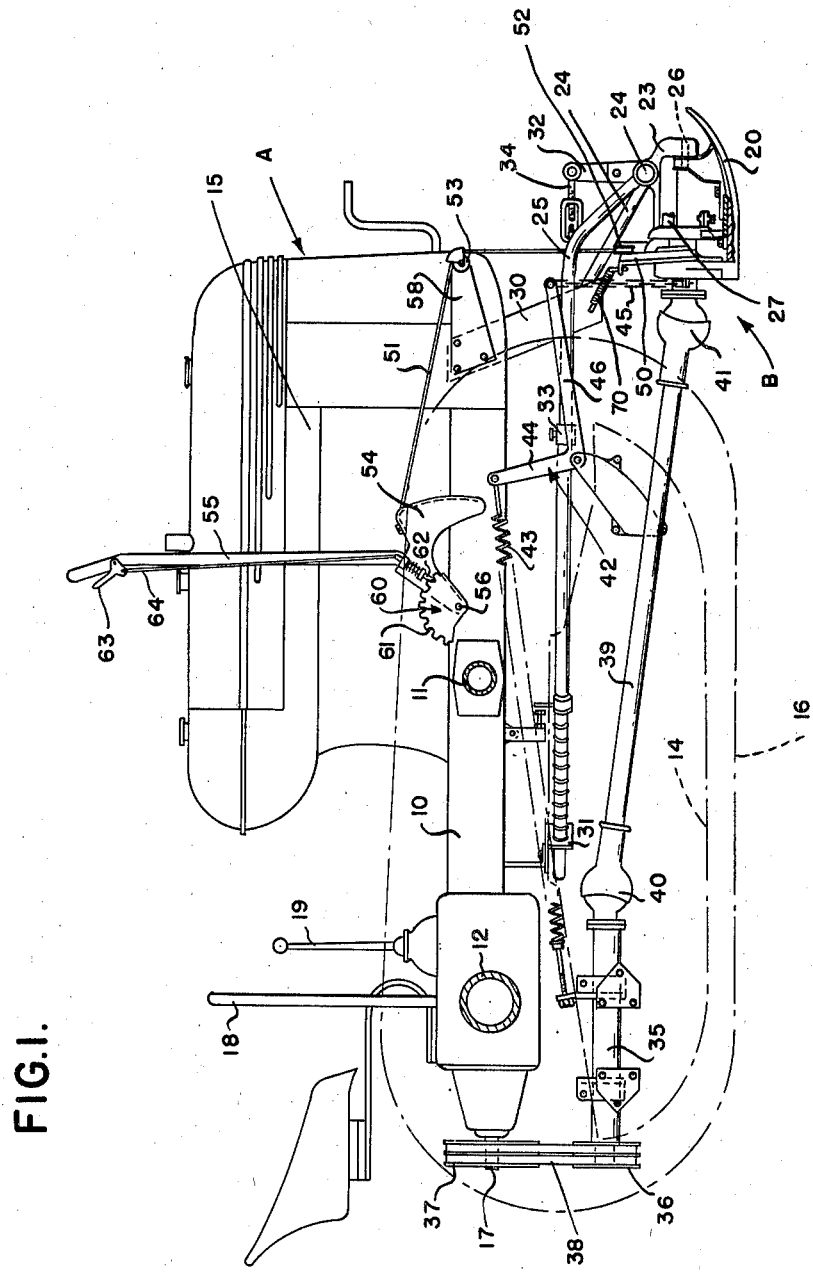
Figure 1 is a side elevation partly in section showing the tractor mower assembly.
Figure 2:
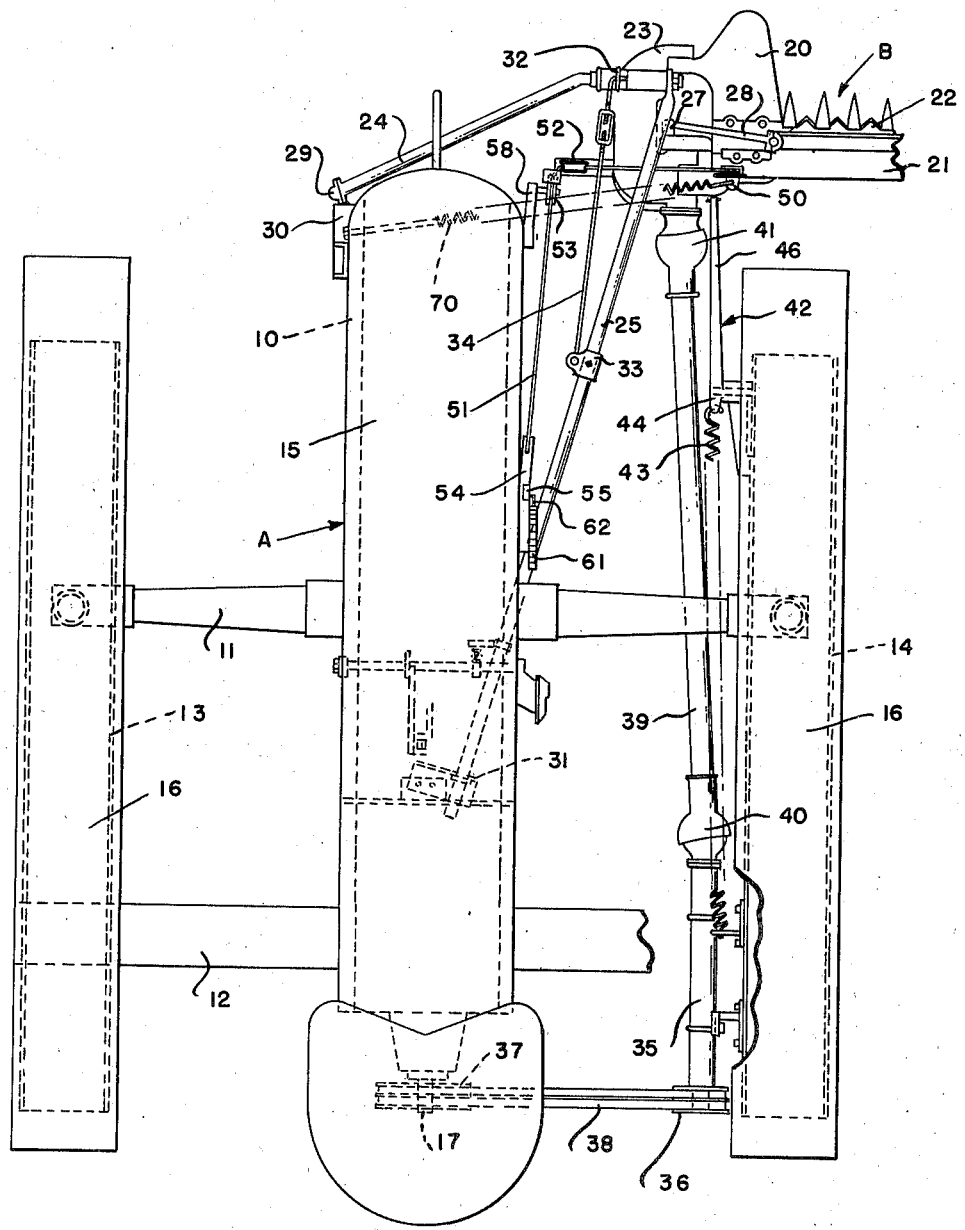
Figure 2 is a top plan view with parts broken away of the same tractor mower.
Figure 3:
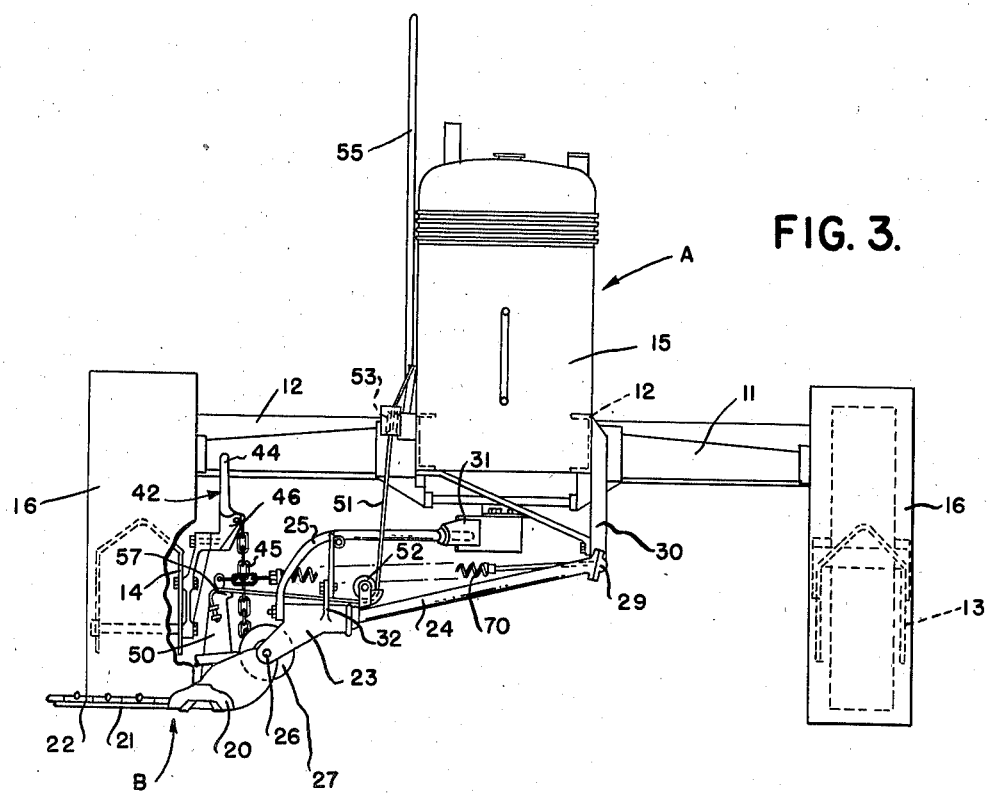
Figure 3 is a front elevation of the tractor mower.
Figure 4:
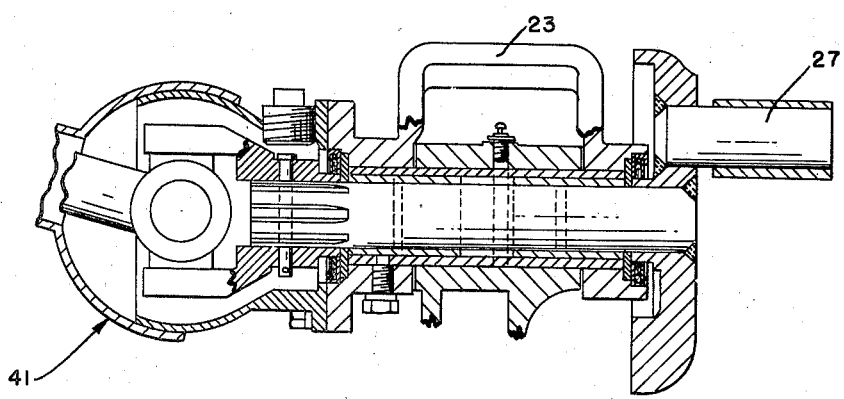
Figure 4 is a vertical section through the hinge bearing and crank shaft assembly.

Referring now to the drawings, A is the tractor, and B is the mower structure of an assembly embodying my invention.

As shown, the tractor A has a main frame 10 supported by spaced tubular members 11 and 12 from laterally spaced endless track frames 13 and 14. Enclosed within a housing 15 on the main frame 10 is an internal combustion engine having a driving connection (not shown) with endless tracks 16 on the track frames and having a power take-off shaft 17. As usual, the tractor has a steering brake 18 and a gear shift lever 19.

The mower structure B comprises a mower shoe 20, a mower arm 21 rigid with said shoe, and a reciprocating sickle or cutter bar 22 carried by the mower arm 21. Preferably this structure is at the front of the tractor and is supported therefrom by a bracket 23 and a pair of rods 24 and 25, respectively. As shown, the bracket 23 is a casting and is hingedly connected at 26 to the mower shoe 20. Such bracket 23 is sleeved on the rod 24 and carries a crank shaft 27 to which a pitman rod 28 for reciprocating the sickle bar 22 is connected. The rod 24 is disposed in front of the tractor and is connected by a universal joint 29 to a bracket 30 on the main frame 10 of the tractor at the remote side thereof. The rod 25 is connected at its forward end to the rod 24 and extends rearwardly through and slidably and pivotally engages a bracket 31 fixed to the main frame 10 of the tractor.

By positioning the mower structure at the front of the tractor it is possible to cut a square corner in a hayfield, and by turning before it gets to the corner, the tractor is then in position to continue on to the next right angle side of the field without delay. The described arrangement is simple and easy to construct and assemble. In addition, it offers substantial advantages in normal operation.

For tilting the bracket 23 about the rod 24 to raise and lower the cutting edge of the sickle bar 22 relative to the ground so as to vary the height of cut, there is an upstanding arm 32 on the bracket, an adjusting collar or sleeve 33 on the rod 25, and an adjustable link 34 terminally connected to said sleeve 33 and arm 32.

For driving the cutter or sickle bar 22 from the tractor, I have provided a countershaft 35, pulleys 36 and 37 on the countershaft 35 and power take-off shaft 17, endless belts 38 trained around said pulleys, and a propeller shaft 39 terminally connected by universal joints 40 and 41 to the countershaft 35 and crank shaft 27.

To support the weight of the mower structure, I have provided a bell crank lever 42, a counterbalancing spring 43 terminally connected to the adjacent track frame 13 and to one arm 44 of the bell crank lever, and a chain 45 terminally connected to the other arm 46 of said bell crank lever and to the mower shoe 20.

In order that the mower structure B may be swung about the pivot 26 relative to its supporting means, and the latter comprising the bracket 23 and rods 24 and 25 may be swung vertically relative to the tractor, I have provided an upstanding arm 50 on the mower shoe 20, a cable 51 trained around suitable pulleys 52 and 53 and terminally connected to said arm 50 and to a quadrant 54 rigid with a hand lever 55 pivoted at 56. As shown, the arm 50 is rigid with the shoe and is provided at its upper end with a nose piece 57 that is adapted to engage the bracket 23 when the mower arm 21 is swung upwardly a predetermined amount about the pivot 26. The cable 51 is secured to the arm 50 at its upper end and extends under the pulley 52 and over the pulley 53 to the quadrant 54 to which it is rigidly secured. The pulley 52 is carried by the bracket 23 substantially in horizontal alignment with the upper end of the arm 50 on the shoe, while the pulley 53 is substantially in vertical alignment with the pulley 52 and is carried by a bracket 58 fixed to the frame 10 of the tractor. The hand lever 55 carrying the quadrant 54 is pivoted at 56 to a bracket 60 fixed to the frame 10 of the tractor. This bracket 60 has a toothed sector 61 engageable by a spring pressed latch 62 on the hand lever 55 to hold the latter in adjusted position. A suitable hand operated release member 63 for the latch 62 is provided on the lever 55 and is connected by a rod 64 to said latch for actuating the same.

In use, when the lever 55 is pulled rearwardly, the cable 51 and pulley 52 will exert an upward pull on the bracket 23 tending to swing said bracket and rods 24 and 25 upwardly about the universal joint 29 and bracket 31. The arm 50 will then be pulled by the cable 51 toward the pulley 52 so that the mower arm 21 and shoe 20 will be swung upwardly about the pivot 26.

The nose piece 57 of the arm 50 will strike the bracket 23 when the mower arm 21 is in an upright position and therefore will limit or stop the upward swinging movement of the mower arm relative to the bracket 23 and rods 24 and 25 constituting the supporting means. However, as the lever 55 is pulled back further, the cable 51, pulley 52 and engagement of the arm 50 with the bracket 23 will cause the bracket 23, rods 24 and 25, mower arm 21 and shoe 20 to be swung upwardly as a unit relative to the tractor. The latch 62 for the hand lever 55 may engage the sector 61 and hold the parts in any position of adjustment. When the bracket 23 has been elevated, the shoe 20 will be clear of the ground, as is desirable when it is necessary to move the tractor for considerable distances without performing any cutting operations.

For assisting the upward swinging action of the mower arm 21 there is a spring 70 terminally connected to the upstanding arm 50 on the shoe and to the bracket 30 on the tractor. As will be evident, the spring 70 exerts a clockwise movement on the arm 50 tending to raise the cutter bar 22.

What I claim as my invention is:

1. In a tractor mower assembly, a tractor having a frame, a mower assembly including a mower shoe, means for supporting the assembly from the tractor including a pair of bars pivoted to the frame, a hinge bracket carried by said bars and connected to the shoe, an arm carried by the shoe and engageable with the bracket to limit swinging movement of the shoe, and means connected to the arm for swinging the shoe relative to the bracket and adapted when the arm strikes the bracket to lift the shoe, bracket and bars about the pivots for the latter.

2. In a tractor mower assembly, a tractor having a frame, a mower assembly, means supporting the mower assembly from the frame including a hinge bracket, a mower shoe pivoted to said bracket, and means for swinging the shoe about its pivot relative to the bracket, said means including an arm carried by the shoe and engageable with the bracket to limit such swinging movement.

3. In a tractor mower assembly, a tractor, a mower assembly, means for supporting said mower assembly from said tractor, said mower assembly being mounted to swing vertically relative to said supporting means, said supporting means being mounted to swing vertically relative to said tractor, and means for swinging the mower assembly relative to the supporting means including means for swinging the supporting means relative to the tractor.

4. In a tractor mower assembly, a tractor, a mower assembly, means for supporting said mower assembly from said tractor, said mower assembly being mounted to swing vertically relative to said supporting means, said supporting means being mounted to swing vertically relative to said tractor, and an element carried by the mower assembly and engageable with a part of the supporting means to limit swinging movement in one direction of the mower assembly.

5. In a tractor mower assembly, a tractor, a mower assembly, means for supporting said mower assembly from said tractor, said mower assembly being mounted to swing vertically relative to said supporting means, said supporting means being mounted to swing vertically relative to said tractor, and means for swinging the mower assembly relative to the supporting means including means engageable with a part of the supporting means to limit swinging movement in one direction of the mower assembly.

6. In a tractor mower assembly, a tractor, a mower assembly, means for supporting said mower assembly from said tractor, said mower assembly being mounted to swing vertically relative to said supporting means, said supporting means being mounted to swing vertically relative to said tractor, and means for swinging the supporting means including means carried by the mower assembly and engageable with the supporting means to cause the mower assembly to move with the supporting means.

7. In a tractor mower assembly, a tractor, a mower assembly, means for supporting said mower assembly from said tractor, said mower assembly being mounted to swing vertically relative to said supporting means, said supporting means being mounted to swing vertically relative to said tractor, an upstanding arm rigid with a part of the mower assembly, a pulley carried by a part of the supporting means, actuating means for said supporting means and mower assembly including an element fixed to said upstanding arm and engaging said pulley, and means terminally connected to said upstanding arm and tractor for assisting the actuating means aforesaid.

8. In a tractor mower assembly, the combination with a tractor, a bracket supported from the tractor so as to swing vertically relative thereto, and a mower assembly pivotally connected to the bracket, of means for swinging the bracket relative to the tractor and pivoting the mower assembly relative to the bracket including means carried by the mower assembly and engageable with the bracket to limit pivotal movement of the mower assembly relative to the bracket.

9. In a tractor mower assembly, the combination with a tractor, a bracket supported from the tractor so as to swing vertically relative thereto, and a mower assembly pivotally connected to the bracket, of means for swinging the bracket relative to the tractor and pivoting the mower assembly relative to the bracket including an upstanding arm rigid with the mower assembly, a pulley on the bracket substantially in horizontal alignment with the upper end of the arm, and a cable engaging the pulley and connected to said arm.

10. In a tractor mower assembly, the combination with a tractor, a bracket supported from the tractor so as to swing vertically relative thereto, and a mower assembly pivotally connected to the bracket, of means for swinging the bracket relative to the tractor and pivoting the mower assembly relative to the bracket including an upstanding arm rigid with the mower assembly, a pulley on the bracket, and a cable engaging the pulley and connected to said arm, said arm having a nose piece engageable with the bracket to cause the bracket and mower assembly to swing in unison relative to the tractor.

11. In a tractor mower assembly, the combination with a tractor, a bracket supported from the tractor so as to swing vertically relative thereto, and a mower assembly pivoted to said bracket, of means for swinging the bracket relative to the tractor and pivoting the mower assembly relative to the bracket including an upstanding arm on the mower assembly, a pulley on the bracket substantially in horizontal alignment with the upper end of the arm, a pulley carried by the tractor substantially in vertical alignment with the pulley aforesaid, and a cable engaging said pulleys and secured to said arm.

12. In a tractor mower assembly, the combination with a tractor, a bracket supported from the tractor so as to swing vertically relative thereto, and a mower assembly pivoted to said bracket, of means for swinging the bracket relative to the tractor and pivoting the mower assembly relative to the bracket including an upstanding arm on the mower assembly, a pulley on the bracket, a pulley carried by the tractor above the pulley aforesaid, a cable engaging said pulleys and secured to said arm, and means for assisting the swinging action of the mower assembly including a spring terminally connected to said arm and to said tractor.

13. In a tractor mower assembly, the combination with a tractor, of a bracket adjacent the tractor, supporting members for the bracket connected to the tractor so that the bracket may swing vertically relative thereto, a mower assembly including a mower shoe connected to said bracket so that it can swing vertically relative to the bracket, and a single means for swinging the bracket relative to the tractor and for swinging the shoe relative to the bracket including an element carried by the mower assembly and engageable with the bracket, said member serving to limit swinging movement of the mower assembly relative to the supporting members and cooperating with the bracket to cause the mower assembly to swing with the supporting members relative to the tractor.

14. In a tractor mower assembly, the combination with a tractor, of a bracket adjacent the tractor, supporting members for the bracket connected to the tractor so that the bracket may swing vertically relative thereto, a mower assembly including a mower shoe connected to said bracket so that it can swing vertically relative to the bracket, and a single means for swinging the bracket relative to the tractor and for swinging the shoe relative to the bracket including an arm rigid with the shoe and engageable with the bracket, and a cable connected to said arm.

15. In a tractor mower assembly, the combination with a tractor, of a bracket adjacent the tractor, supporting members for the bracket connected to the tractor so that the bracket may swing vertically relative thereto, a mower assembly including a mower shoe connected to said bracket so that it can swing vertically relative to the bracket, and a single means for swinging the bracket relative to the tractor and for swinging the shoe relative to the bracket including an arm rigid with the shoe and engageable with the bracket, a pulley carried by the bracket substantially in horizontal alignment with the free end of the arm, and a cable connected to the free end of the arm and trained under said pulley.

16. In a tractor mower assembly, the combination with a tractor, of a bracket adjacent the tractor, supporting members for the bracket connected to the tractor so that the bracket may swing vertically relative thereto, a mower assembly including a mower shoe connected to said bracket so that it can swing vertically relative to the bracket, and a single means for swinging the bracket relative to the tractor and for swinging the shoe relative to the bracket including an arm rigid with the shoe and engageable with the bracket, a cable connected to said arm, and means for assisting the upward swinging movement of the mower assembly including a spring terminally connected to said arm and to said tractor.

HOWARD W. SIMPSON.